US010840045B1

(12) United States Patent
Cox

(10) Patent No.: US 10,840,045 B1
(45) Date of Patent: Nov. 17, 2020

(54) INVERTIBLE OPTICAL FLOAT SWITCH

(71) Applicant: Christopher E. Cox, Baton Rouge, LA (US)

(72) Inventor: Christopher E. Cox, Baton Rouge, LA (US)

( * ) Notice: Subject to any disclaimer, the term of this patent is extended or adjusted under 35 U.S.C. 154(b) by 0 days.

(21) Appl. No.: 16/431,210

(22) Filed: Jun. 4, 2019

(51) Int. Cl.
*H01H 35/18* (2006.01)
*G01F 23/76* (2006.01)
*G01F 23/70* (2006.01)
*G01F 23/30* (2006.01)
*G02B 6/26* (2006.01)
*G01F 23/44* (2006.01)

(52) U.S. Cl.
CPC ............. *H01H 35/18* (2013.01); *G01F 23/30* (2013.01); *G01F 23/446* (2013.01); *G01F 23/706* (2013.01); *G01F 23/76* (2013.01); *G02B 6/26* (2013.01); *H01H 2219/0621* (2013.01)

(58) Field of Classification Search
None
See application file for complete search history.

(56) References Cited

U.S. PATENT DOCUMENTS

| | | | |
|---|---|---|---|
| 3,082,400 A | 3/1963 | Coop | |
| 3,120,125 A | 2/1964 | Vasel | |
| 3,863,067 A | 1/1975 | Gooley | |
| 4,051,723 A | 10/1977 | Head et al. | |
| 4,064,754 A | 12/1977 | Frey | |
| 4,091,671 A | 5/1978 | McLees | |
| 4,156,149 A | 5/1979 | Vaccari | |
| 4,519,257 A | 5/1985 | Simpkins | |

(Continued)

FOREIGN PATENT DOCUMENTS

| | | |
|---|---|---|
| EP | 0354169 | 2/1990 |
| JP | 56135805 | 10/1981 |

(Continued)

*Primary Examiner* — Michelle R Connelly
(74) *Attorney, Agent, or Firm* — Jones Walker LLP

(57) ABSTRACT

An invertible optical float switch is provided, comprising a floatable housing having an interior, a central longitudinal axis, a top end and a bottom end; first and second optical fibers each having proximal and distal ends, the proximal end of the first optical fiber connectable to a light source located remote from the housing, the proximal end of the second optical fiber connectable to a light detector located remote from the housing, the distal ends of the first and optical fibers positioned in the interior of the housing and the distal ends being mounted in the interior on a separator assembly such that the distal ends are optically aligned and separated by a gap; the separator assembly further including a movable member, the movable member adapted to be movable by gravity between a first position where the movable member occupies the gap such that the distal ends are no longer optically aligned, and a second position where the movable member does not occupy the gap; wherein the distal ends and the separator assembly are mounted on a paddle positioned in the interior of the floatable housing, the paddle adapted to be mounted either in position A with the gap closer to the top end of the floatable housing than the bottom end of the floatable housing, or in an inverted position B with the gap closer to the bottom end of the floatable housing than in position A.

10 Claims, 7 Drawing Sheets

(56) References Cited

U.S. PATENT DOCUMENTS

| | | |
|---|---|---|
| 4,629,841 A | 12/1986 | Riback et al. |
| 4,773,265 A | 9/1988 | Baillie et al. |
| 4,836,632 A | 6/1989 | Bardoorian |
| 4,856,874 A | 8/1989 | Tusting |
| 4,938,590 A | 7/1990 | Ishida |
| 5,017,748 A | 5/1991 | Sapiro |
| 5,072,617 A | 12/1991 | Weiss |
| 5,105,663 A | 4/1992 | Kuhlen |
| 5,124,686 A | 6/1992 | White et al. |
| 5,130,535 A | 7/1992 | Kummer et al. |
| 5,133,030 A | 7/1992 | Lee |
| 5,175,780 A | 12/1992 | Sano et al. |
| 5,373,153 A | 12/1994 | Cumberledge et al. |
| 5,585,786 A | 12/1996 | Clark et al. |
| 5,684,296 A | 11/1997 | Hamblin et al. |
| 5,743,135 A | 4/1998 | Sayka et al. |
| 5,874,899 A | 2/1999 | Barmore, Jr. et al. |
| 5,917,180 A | 6/1999 | Reimer |
| 5,950,487 A | 9/1999 | Maresca, Jr. et al. |
| 6,125,218 A | 9/2000 | Humphrey |
| 6,218,949 B1 | 4/2001 | Issachar |
| 6,555,837 B2 | 4/2003 | Benton |
| 6,650,820 B2 | 11/2003 | Ross et al. |
| 6,727,822 B2 | 4/2004 | Chamberlin et al. |
| 6,832,035 B1 | 12/2004 | Daoud et al. |
| 7,234,830 B1 | 6/2007 | Cox et al. |
| 7,272,289 B2 | 9/2007 | Bickham et al. |
| 7,444,042 B1 | 10/2008 | Niblock et al. |
| 7,714,732 B2 | 5/2010 | Cox et al. |
| 7,772,538 B2 | 8/2010 | Cox et al. |
| 7,902,989 B2 | 3/2011 | Cox et al. |
| 8,314,711 B2 | 11/2012 | Cox et al. |
| 8,334,501 B1 | 12/2012 | Cox et al. |
| 2006/0139177 A1 | 6/2006 | Gomery |
| 2010/0066548 A1* | 3/2010 | Cox ............... G01F 23/2921 340/619 |

FOREIGN PATENT DOCUMENTS

| | | |
|---|---|---|
| JP | 357042817 | 3/1982 |
| JP | 07218847 | 8/1995 |
| WO | 03/102515 | 12/2003 |
| WO | 08/147415 A1 | 12/2008 |
| WO | 10011942 A1 | 1/2010 |
| WO | 10093929 A1 | 8/2010 |

* cited by examiner

INVERTIBLE OPTICAL FLOAT SWITCH

FIELD OF INVENTION

The invention relates to optical switches, such as switches used in liquid level detection in tanks or switches to activate equipment within a hazardous environment and, in particular, floatable optical switches that can be easily modified to be either normally open or normally closed.

BACKGROUND OF THE INVENTION

Many working environments present explosion hazards or present a risk of electrical shock. One hazardous environment is a pumping station or a tank or pit that contains hazardous and/or flammable or volatile gases or liquids and chemicals to be pumped. Float switches are commonly used in applications of this sort to detect a level for the activation of a pump (see FIG. 2), but float switches often have electrical current that passes through wires and a switch housed within the float, such as a mercury switch located in the float. Wires from the float switch run to a control panel (or other device) located external to the tank or pit and are located outside the hazardous area. Some specialty control panels are explosion-proof and can be located in the hazardous area. As liquids rise in the tank, the float tilts and a ball or conductive liquid, such as mercury, moves and makes contact with an electrical switch or contacts of some sort causing the switch to activate. Electrical current then passes from the control panel through the wires, to the switch, completing the circuit. This presents a spark hazard, and if a breakdown in insulation occurs along the electrical path, an explosion can result.

In some hazardous environments, explosion-proof containers are used to contain equipment or devices that may present a possible sparking hazard, such as controls, pumps, motors, etc. While pumps or other devices located in a hazardous environment may be contained in an explosion-proof housing, these devices must be activated or deactivated by electrical signals (i.e., providing power to the device). Activation is done remotely from the hazardous environment to reduce the possibility of explosion. Hence, when an operator is onsite, the operator cannot manually activate/deactivate the device within the hazardous area unless the activation device is in an explosion-proof housing.

One switch device that overcame these deficiencies is the floatable optical switch, such as described in U.S. Pat. Nos. 7,902,989 and 8,314,711 and PCT/US2009/051714, all hereby incorporated by reference.

Shown in FIG. 1A and FIG. 1B is an embodiment of a floatable optical switch. The switch device includes a housing 1, two light guides 2 (also referred to herein as optical fibers), a light source 3, and a movable member 4 which is selectively interposed between distal ends 21 of aligned optical fibers 2. Optical fibers 2 are usually contained and protected by a jacketed optical cable 23. In the embodiments shown in the Figures, optical cable 23 contains two optical fibers 2. In the embodiment shown in FIG. 1A, housing 1 is floatable, and optical cable 23 tethers housing 1 to a fixed point, allowing the float to rise and fall with the media (such as water) for a range of elevations. Tethered float switches are sometimes designed as tilt switches or tilt detectors. A tethered or anchored float switch may float on a liquid surface or be fully submerged in the liquid, with its elevation restrained by the tether attached to a fixed point, such as a wall or an anchor. One of the optical fibers 2 is connected at its proximal end 22 to a light source 3, and the other optical fiber 2 is connected at its proximal end 22 to a light detector 5. Light source 3 can be any suitable source, such as a laser, incandescent light bulb, sunlight, a light emitting diode, etc. and "light" generally refers to any electromagnetic radiation. For fiber optics, preferably light source 3 will consist of visible light, infrared light, sunlight, and ultraviolet light. It is more preferable that light source 3 emanate light from about 300 nanometers to about 30,000 nanometers in frequency. Preferably, light source 3 and light detector 5 will be located external to the hazardous area in a control panel or other location (they do not have to be located together), and only fiber optic cables 23 will travel into the hazardous area to housing 1.

Optical cable 23 and/or optical fibers 2 pass into the interior of housing 1 through a preferably sealed connection, usually at one end of housing 1. Distal ends 21 of the optical fibers 2 are positioned in housing 1 near each other, but separated by a gap 10 (see FIG. 1B). Gap 10 is generally positioned in a separator assembly 6 within housing 1. Separator assembly 6 holds optical fiber distal ends 21 in place, thus maintaining gap 10. Gap 10 can vary in size, with 0.01-0.5 inch suitable for most applications, but could be larger. Some light detectors can sense the presence of light radiation across a gap of up to four inches. Distal ends 21 of optical fibers 2 should be "optically aligned," or "optically alignable." That is, light emitted from one optical fiber distal end 21 will travel though gap 10 (possibly along a zig-zag path if reflective material, such as mirrors, are employed to bounce the emitted beam appropriately) and a portion of the transmitted light will enter distal end 21 of the second optical fiber 2. The portion of emitted light that is received at the reception fiber 2, through the optical alignment, should be sufficient to allow light detector 5 to detect the presence of light in the optical fiber 2 receiving light across gap 10. As an example of the use of reflection, optical fibers 2 may be parallel with 45 degree reflective surfaces positioned at distal ends 21 such that the two optical fibers 2, while parallel, are optically aligned by a path reflection off the reflective surfaces and across a gap 10 between the reflective surfaces. In any embodiment, the allowable separation of the two distal ends 21 will depend upon the sensitivity of light detector 5 and the strength of light source 3.

As shown in FIG. 1B, a preferred separator assembly 6 generally includes a translucent internal chamber 6A with one optical fiber 2 distal end 21 positioned adjacent to, in, or on the wall of internal chamber 6A and the other optical fiber 2 distal end 21 positioned on an opposite wall of internal chamber 6A, with the two distal ends 21 optically aligned. Separator assembly 6 is generally an assembly removable from the interior of housing 1 with optical fibers 2 positioned on the assembly. The diameter of internal chamber 6A of separator assembly 6 establishes the gap 10 between optical fiber 2 terminal ends 21. Located within internal chamber 6A is a movable member 4, such as a rollable or slidable ball or bar or cylinder, or an opaque fluid positioned within internal chamber 6A and partially filling the chamber. Movable member 4 occupies gap 10, interrupting optical alignment when gravity causes movable member 4 to move into gap 10. If housing 1 floats, at a certain level the floating housing 1 will tilt, and as it tilts, movable member will move within the internal chamber due to gravitational forces. If the degree of movement is sufficient, movable member 4 will block (or unblock) the light path between distal ends 21 of optical fibers 2, thereby changing the status of the switch from open (light blocked) to closed (light transmitted), or vice versa. Additionally, movable member 4 may modify the transmitted light, for instance, change the color, frequency or amplitude, to such an extent that the transmitted light is not recognized by light detector 5. Internal chamber 6A may comprise a clear glass or plastic ampule. Movable member 4 may comprise an opaque steel or plastic ball. Movement of the ball may be dampened by filling or partially filling the ampule with a damping fluid such as mineral oil.

A separator assembly 6 is shown in FIG. 3, mounted on a paddle 60, preferably constructed of plastic. Formed in paddle 60 are clips 61 to hold ampule 6A and optical fibers 2. Paddle 60 is inserted in the bottom portion of housing 1 and fixed into position. Various means known in the art for attaching paddle 60 to housing 1 can be employed. For example, paddle 60 may be fixed by potting or other attachment of the bottom portion of paddle 60 to housing bottom end 1A, leaving the top portion of paddle 60 free to flex. Housing top end 1B is then attached to bottom end 1A, such as by RF welding or spin (or friction) welding. As shown, the top of paddle 60 is not form fitting to housing top portion 1B, to allow the top of paddle 60 (where ampule 6A is located) to flex in response to shock forces. For instance, operators have been known to clean floats by swinging the float by the tether and slamming the float into a wall or on the ground.

FIG. 3 depicts a prior art paddle 60, with optical fibers 2 coupled to paddle 60 and then directed to the center of paddle 60, where separator assembly 6 is located. Distal ends 21 are fixed in an optically aligned configuration. Interior chamber 6A and separator assembly 6 are generally centered along the central longitudinal axis 30 of housing 1 (the natural axis that extends from the bottom to the top of the float when the float is floating). In a float upright position, movable member 4 is positioned at the bottom of ampule 6A. In this position, the optical switch is normally closed (light transmitted across gap 10).

If the user requires a normally open (light not transmitted across gap 10) switch, this design is not suitable, unless the configuration of the readings of the light receiver are modified to reverse the normal switch indicators (e.g., to specify that light blockage is the closed condition, and light transmission is the open condition). This can be a costly modification. A new paddle 60 would need to be designed to reverse the position of separator assembly 6. A better design is needed to provide an easy and inexpensive manufacturing modification to allow the optical switch to be set during manufacturing to either a normally open or normally closed position.

SUMMARY OF THE INVENTION

The invention is an invertible float switch. The switch activation components are contained in a floatable housing and used to signal the need to operate a pump or other device. As discussed, a switch is a device having a status (on/off, make/break, open/closed or other status indicator) that can be used to control an electrical device. The switch invention uses a light beam from a transmitter located outside of the environment of the float, which travels through a light-carrying cable, fiber, tube or light guide (all considered a "light guide") to a switch means located in the floatable housing. Based on the position or status of the switch (optical path interrupted, or optical path complete), light can travel to a powered light detector or receiver located outside the float environment, which detects the status of the switch, and circuitry can act on the status to activate or deactivate a powered device, such as a pump or motor. Several means of breaking or interrupting the light path can be utilized. The controller to which the switch is connected can be configured to activate a pump or device upon detection of the light or detection of the lack of the light. The switch assembly is mounted on an invertible paddle in the interior of the float. With the paddle in one position, the switch can be normally closed. If the paddle is inverted, the switch can be normally open.

OBJECTS OF THE INVENTION

It is an object of the invention to have an optical floatable switch that can be easily configured during assembly to be either normally open or normally closed.

DETAILED DESCRIPTION OF THE INVENTION

Figure 5A:
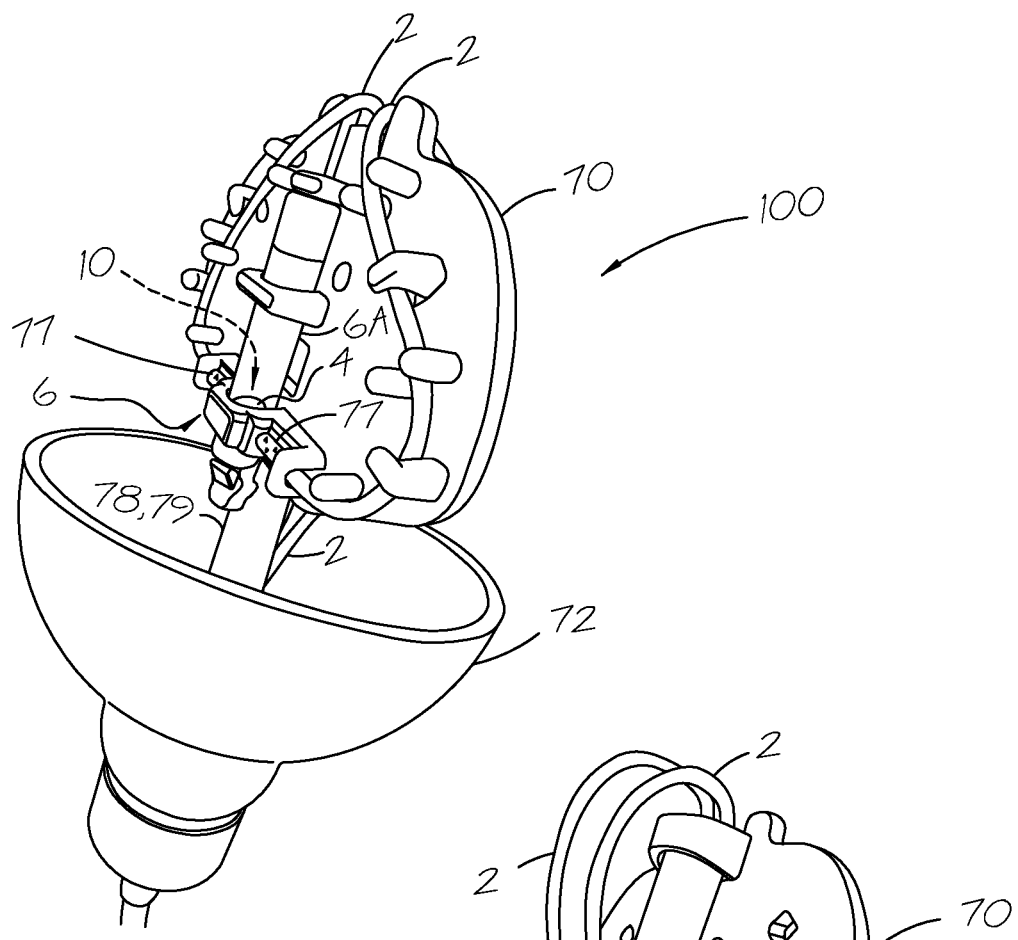
FIG. 5A is a front prospective view of an embodiment of an invertible paddle, in an inverted orientation, with components mounted thereon.
Figure 5B:
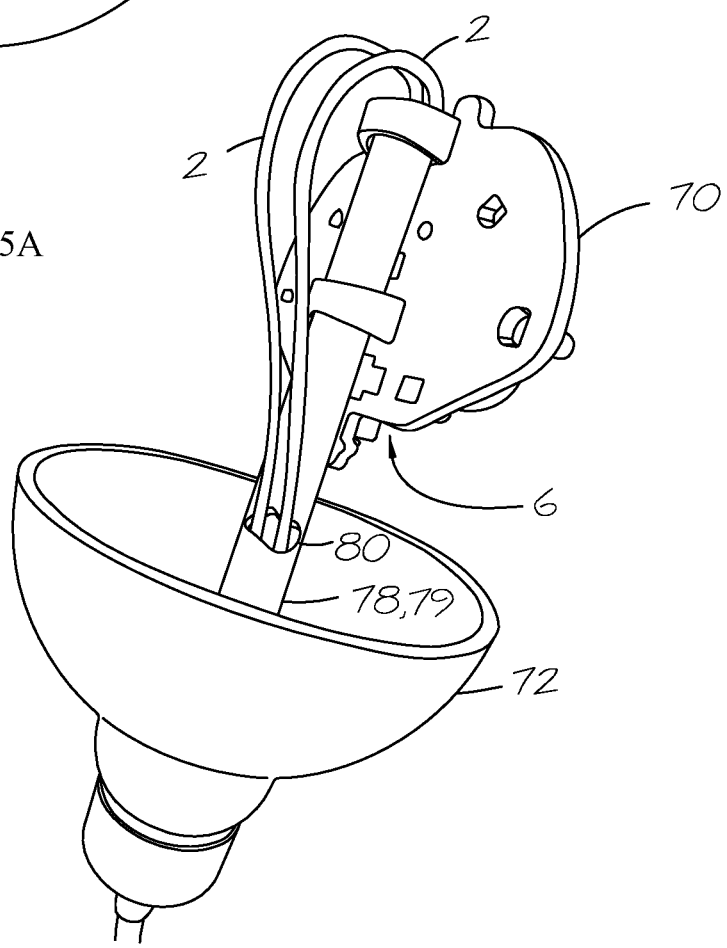
FIG. 5B is a rear perspective view of the paddle assembly of FIG. 5A.
Figures 6A, 6B, 6C, 6D:
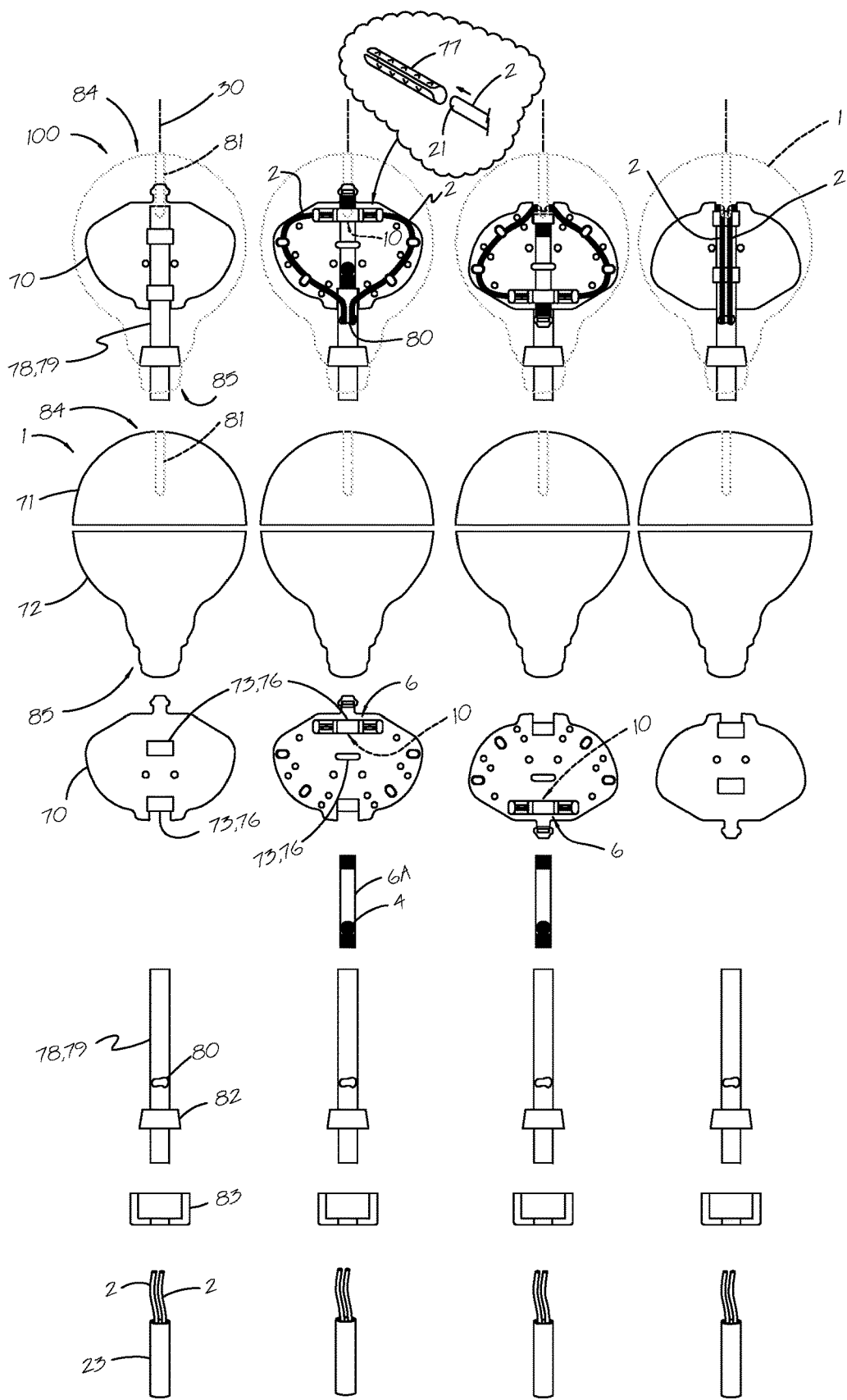
FIG. 6A is an internal and partially exploded rear view of the float switch of the invention with optical alignment near the top of the float housing.
FIG. 6B is an internal and partially exploded front view of the float switch of the invention with optical alignment near the top of the float housing.
FIG. 6C is an internal and partially exploded front view of the float switch of the invention with optical alignment in an inverted position nearer the bottom of the float housing.
FIG. 6D is an internal and partially exploded rear view of the float switch of the invention with optical alignment in an inverted position nearer the bottom of the float housing.

As shown in FIGS. 4-6, an invertible optical float switch 100 is provided, which can be constructed to be normally open or normally closed using by a simple modifications to a paddle 70, and invertible assembly methods. As shown in FIGS. 6A-6D, float housing 1 is preferably wider at top portion 71 than at bottom portion 72. Paddle 70 is preferably positioned within the interior of top portion 71 and follows the same configuration, except smaller such that paddle 70 is contained within housing 1, but does not touch housing 1. By keeping the shape of paddle 70 such that it is contained in housing 1, it is possible for paddle 70 to be installed into housing 1 either with gap 10 nearer to top end 84 of housing 1 or inverted such that gap 10 is oriented closer to bottom end 85 of housing 1. The new design still leaves sufficient space between the interior walls of housing 1 and paddle 70 to help isolate the components mounted on paddle 70 from shock loads to float housing 1. References to the "top portion" or "top end" and "bottom portion" or "bottom end"

of housing 1 are merely for convenience in designating one end of housing 1 or the other, and not as a restriction of which end of float switch 100 actually floats in an upward position. Paddle 70 can take various shapes, depending upon the actual shape of housing 1, the desired path for optical fibers 2 and the location of separator assembly 6. For example, paddle 70 can be constructed of a generally elliptical shape as shown in the Figures, but could also be square, round or have an irregular shape, as long as such shape can fit in both an upright and an inverted position within housing 1. Housing 1 and paddle 70 can be constructed of any suitable material. Preferably, housing 1 and paddle 70 are constructed of moldable or extrudable polymeric material.

Figure 1A:
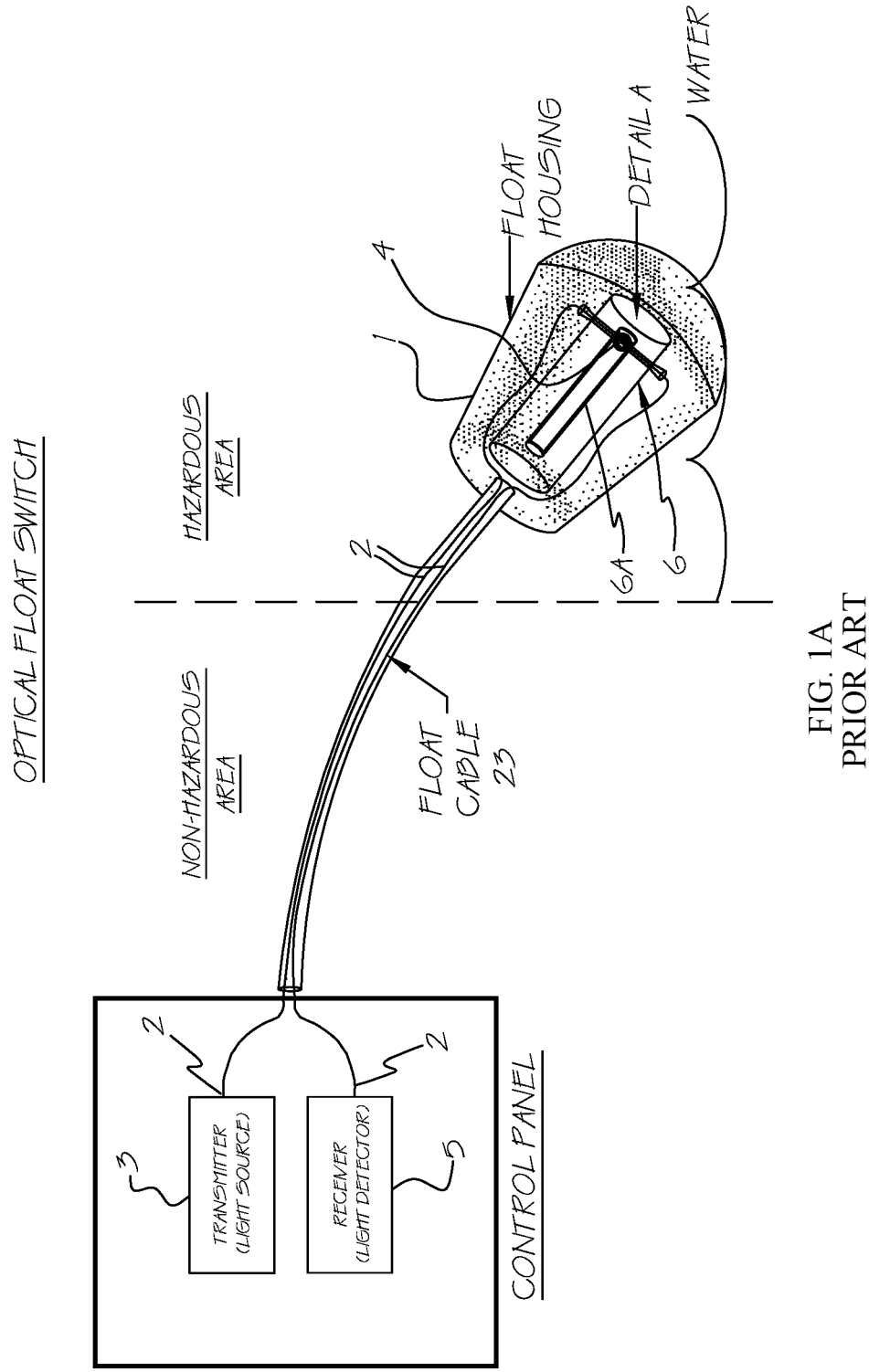
FIG. 1A depicts a prior art optically-activated float switch.
Figure 1B:
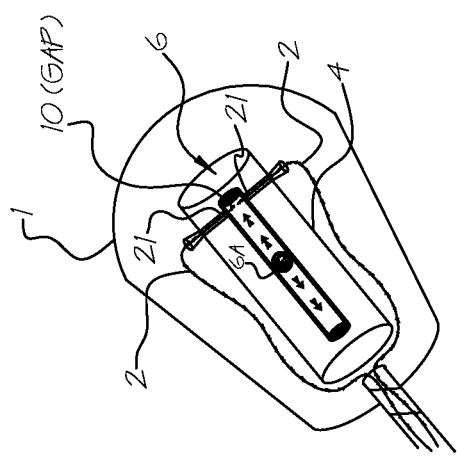
FIG. 1B is a detail of the float switch of FIG. 1A.
Figure 2:
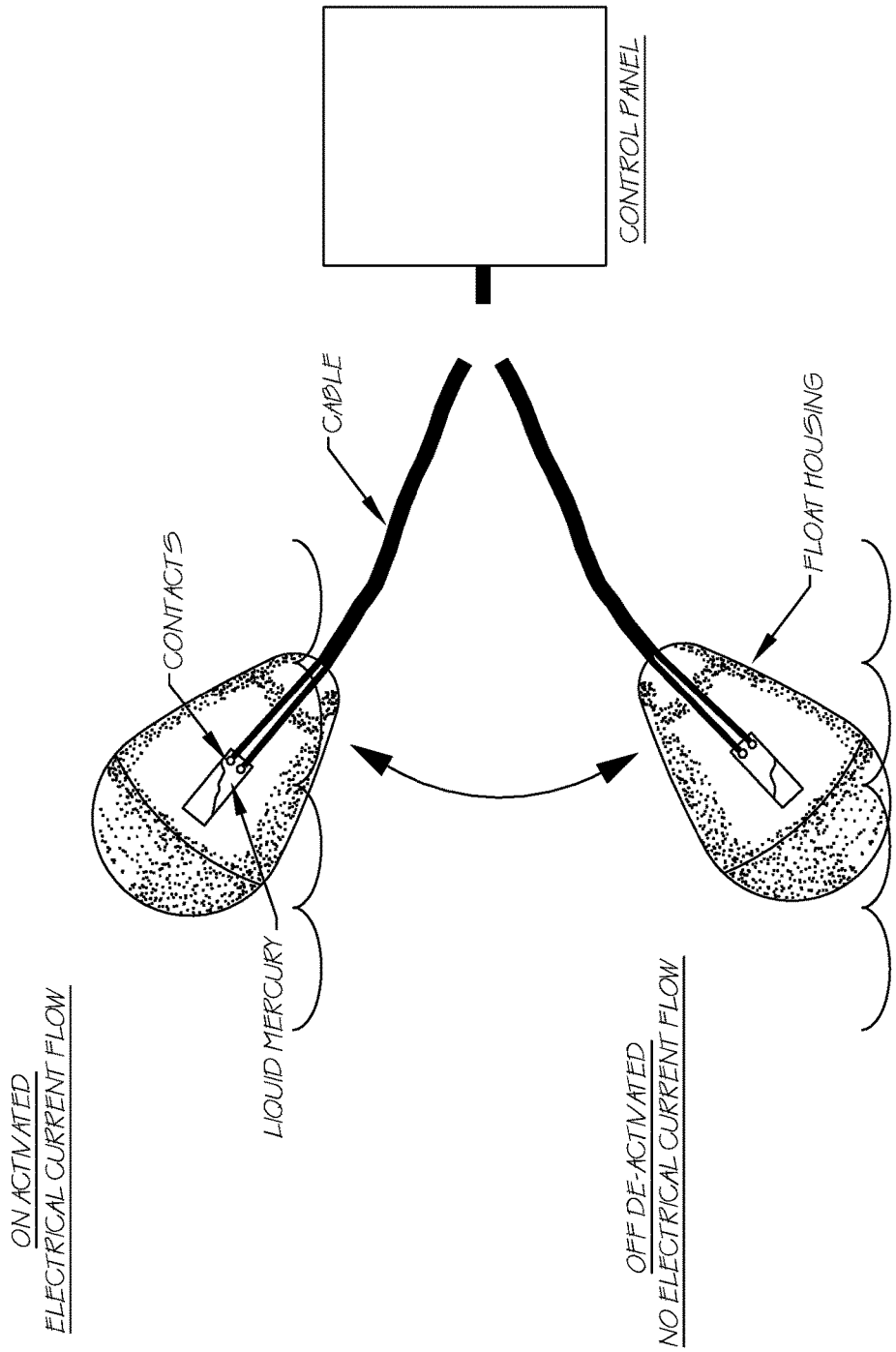
FIG. 2 depicts a conventional prior art float switch.
Figure 3:
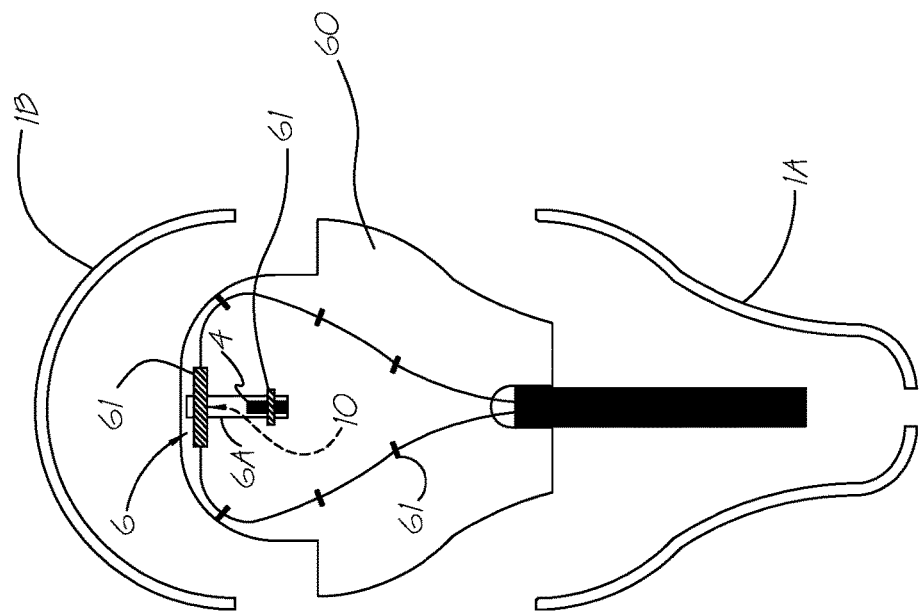
FIG. 3 is a partial cross-section through a prior art float switch embodiment showing the use of a paddle which is not invertible.
Figure 3:
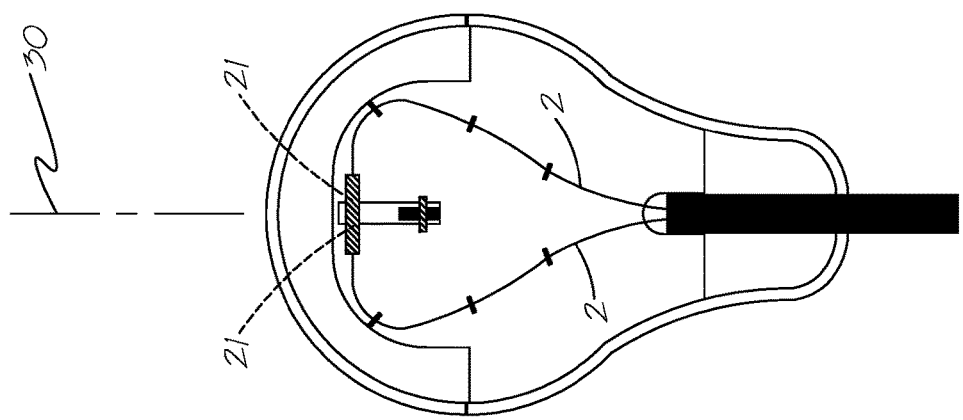
Figure 4A:
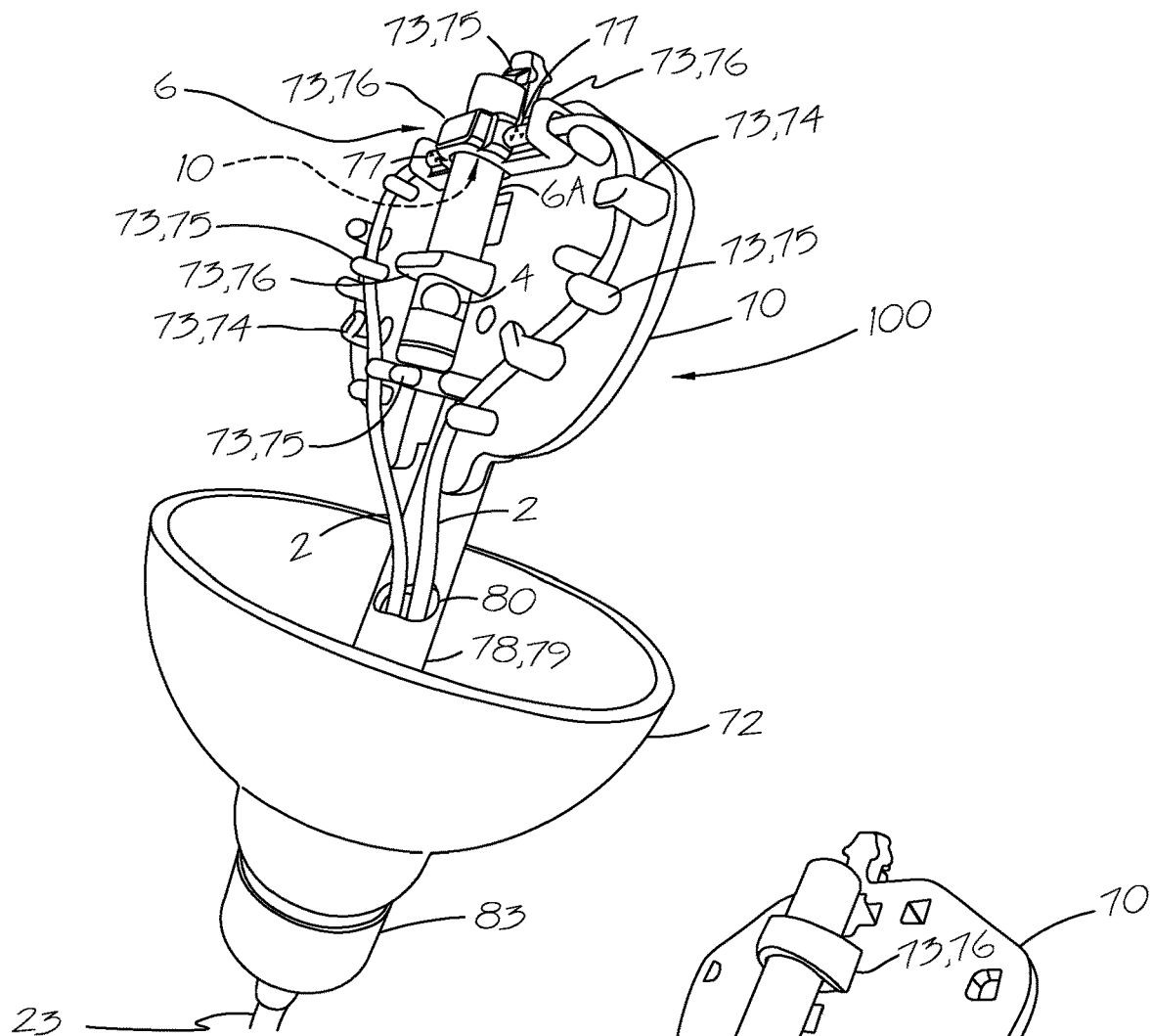
FIG. 4A is a front prospective view of an embodiment of an invertible paddle, in an upright orientation, with components mounted thereon.
Figure 4B:
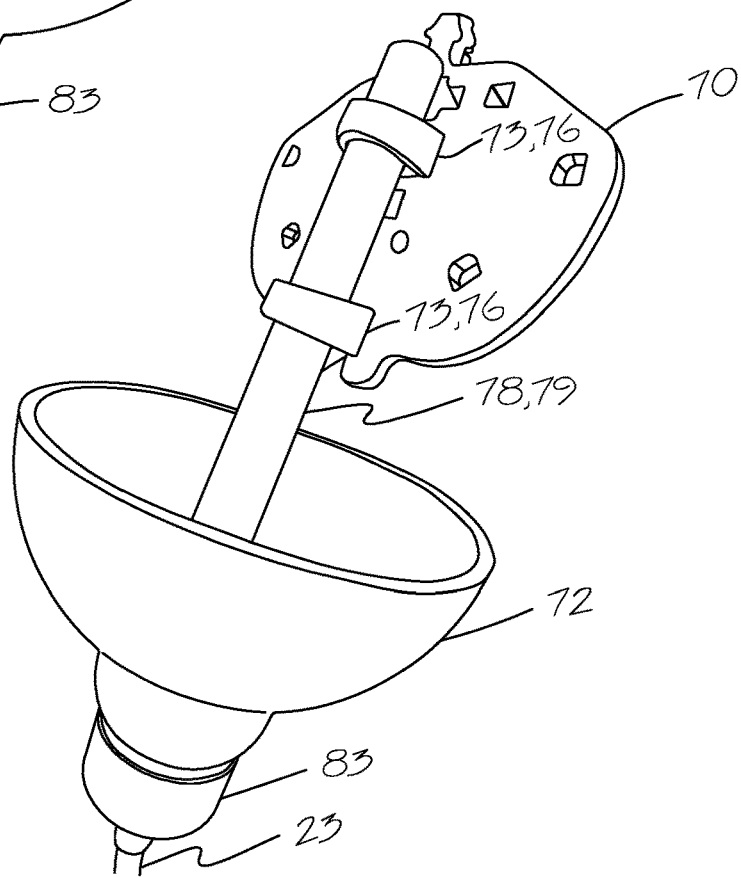
FIG. 4B is a rear perspective view of the paddle assembly of FIG. 4A.

One such invertible paddle 70 is shown in an upright configuration in FIGS. 4A, 4B, 6A and 6B, and in an inverted configuration in FIGS. 5A, 5B, 6C and 6D. As shown in these Figures, the location of separator assembly 6 is fixed on paddle 70, but optical fiber routing can easily be modified between the two configurations. In the upright orientation, separator assembly 6 and gap 10 are oriented closer to top end 84 of housing 1 substantially on central longitudinal axis 30 of housing 1, as shown in FIGS. 4A, 6A and 6B. Distal ends 21 of optical fibers 2 are routed to and inserted in optical alignment into separator assembly 6 as shown. Separator assembly 6 and connector fittings 73 can be molded into paddle 70 as shown. Connector fittings 73 may be used to attach paddle 70 within housing 1 and to attach optical fibers 2 and internal chamber (such as an ampule) 6A to paddle 70. Connector fittings 73 can take any desirable form known in the art. For example, connector fittings 73 may take the form of clips 74, posts 75 or loops 76, which can be molded into paddle 70. As shown in FIG. 4A, optical fibers 2 are mounted onto paddle 70 and are held in place in separator assembly 6. Distal ends 21 are inserted into retention clips 77, which hold distal ends 21 in optical alignment and establish gap 10. In the embodiment shown, separation assembly 6 forms an integral part of paddle 70, allowing distal ends 21 with retention clips 77, as well as ampule 6A, to be held in place on paddle 70. A more detailed view of the retention clip arrangement is shown in FIG. 6B. Ampule 6A, containing movable member 4, is positioned between distal ends 21 as shown. In the embodiment shown, the diameter of ampule 6A establishes gap 10. Urged by gravity upon the tilting of housing 1, movable member 4 (shown as a ball) will occupy gap 10 and block the light beam between distal members 21.

As shown in FIGS. 5A, 5B, 6C and 6D the use of invertible paddle 70 permits the paddle to be easily inverted during the manufacturing process such that separator assembly 6 and gap 10 are closer to bottom end 85 of housing 1. In this configuration, paddle 70 is simply inverted such that optical fibers 2 run down the back of paddle 70 while being otherwise connected in the same fashion as shown in FIG. 4A.

As stated previously, paddle 70 may be attached to housing 1 in a number of ways. Paddle 70 may be attached to housing 1 using a support member 78, which is attached to housing 1 and also attached to paddle 70, preferably such that paddle 70 is substantially centered along central longitudinal axis 30 and does not touch housing 1. This arrangement helps to dampen shock loads created by external physical shock to housing 1. One preferred embodiment has support member constructed of a resilient, flexible polymeric material, further reducing shock transmitted to paddle 70. Additionally, support member 78 may comprise a resilient, flexible tubing member 79, allowing optical fiber 2 to be fed into housing 1 through tubing member 79 and exit tubing member 79 through side opening 80. Tubing member 79 is connectable to paddle by insertion through loops 76 as shown in FIGS. 4B and 5B. In the embodiment shown in FIGS. 6A-D, a pin 81 extends into the interior of housing 1 from top end 84 substantially along central longitudinal axis 30. Pin 81 is insertable into tubing member 79 during assembly and serves to keep paddle 70 centered within housing 1 while allowing it to flex during shock loads to housing 1. Other embodiments of support member 78 will occur to those skilled in the art, such as one or more posts or other attachment surfaces molded into housing 1 such that paddle 70 can be attached to such posts or attachment surfaces using known attachment means, such as welds, glue or screws.

As discussed, the position of paddle 70 is set during assembly. FIGS. 6A-D show front and back assembled and exploded views of the parts of the invertible optical float switch 100. FIGS. 6A and 6B each show an assembled and exploded view of the invertible optical float switch 100 with gap 10 located closer to top end 84 of housing 1. FIGS. 6C and 6D each show an assembled and exploded view of the optical float switch 100 with gap 10 located closer to bottom end 72 of housing 1. Bottom end 72 of housing 1 is sealed using means known in the art. Preferably, tubing support member 79 containing optical cable 23 passed through a resilient stopper 82, which is pressed and sealed into housing 1 and held in place by a snap-on compression cap 83.

As shown in the Figures, invertible paddle 70 may be easily inverted during assembly to allow for assembly either in upright or inverted positions using the same paddle 70. Indicia of the position of paddle 70 may be marked on the exterior of housing 1. It is positioned centrally in housing 1 to resist shock loads. Other embodiments of the invention will occur to those skilled in the art, and such embodiments are intended to be included within the scope and spirit of the following claims.

What is claimed is:

1. An invertible optical float switch comprising:
    a floatable housing having an interior, a central longitudinal axis, a top end and a bottom end;
    first and second light guides each having proximal and distal ends, said proximal end of said first light guide connectable to a light source located remote from said housing, said proximal end of said second light guide connectable to a light detector located remote from said housing, said distal ends of said first and second light guides positioned in said interior of said housing and said distal ends being mounted in said interior on a separator assembly such that said distal ends are optically aligned and separated by a gap;
    said separator assembly further including a movable member, said movable member adapted to be movable by gravity between a first position where said movable member occupies said gap such that said distal ends are no longer optically aligned, and a second position where said movable member does not occupy said gap;
    wherein said distal ends and said separator assembly are mounted on a paddle positioned in said interior of said floatable housing, said paddle adapted to be mounted either in position A with said gap closer to said top end of said floatable housing than said bottom end of said floatable housing, or in an inverted position B with said gap closer to said bottom end of said floatable housing than in position A;
    a paddle support member connectable to at least one said end of said floatable housing and to said paddle such that said paddle is supported by said paddle support member within said interior of said floatable housing; and wherein said paddle support member is tubular and is positioned substantially along said central longitudinal axis and is connectable to said bottom end of said floatable housing.

2. An invertible optical float switch according to claim 1, wherein said paddle support member is constructed of a resilient material.

3. An invertible optical float switch according to claim 1, wherein said paddle is provided with connector fittings to receive and hold said paddle support member and said light guides when said paddle is in either said position A or said position B.

4. An invertible optical float switch according to claim 1, wherein said separator assembly further includes an internal chamber positioned at least partially within said gap and wherein said gap and said internal chamber are substantially aligned with said central longitudinal axis, said internal chamber containing said movable member.

5. An invertible optical float switch according to claim 4, wherein said internal chamber comprises a translucent ampule.

6. An invertible optical float switch according to claim 1, wherein said paddle support member is provided with a side opening and said first and second light guides are insertable through said paddle support member at one said end of said floatable housing and then out through said side opening.

7. An invertible optical float switch according to claim 6, wherein said paddle support member is constructed of a resilient material.

8. An invertible optical float switch according to claim 7, wherein said separator assembly further includes an internal chamber positioned at least partially within said gap and wherein said gap and said internal chamber are substantially aligned with said central longitudinal axis, said internal chamber containing said movable member.

9. An invertible optical float switch according to claim 8, wherein said top end of said housing is provided with a pin extending into said interior of said housing substantially along said longitudinal axis and insertable into said tubular support member.

10. An invertible optical float switch according to claim 1, wherein said top end of said housing is provided with a pin extending into said interior of said housing substantially along said longitudinal axis and insertable into said tubular support member.

* * * * *